United States Patent
Vannithamby et al.

(10) Patent No.: US 7,668,085 B2
(45) Date of Patent: Feb. 23, 2010

(54) COMMON RATE CONTROL COMMAND GENERATION

(75) Inventors: Rath Vannithamby, San Diego, CA (US); Wanshi Chen, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 911 days.

(21) Appl. No.: 10/927,720

(22) Filed: Aug. 27, 2004

(65) Prior Publication Data

US 2006/0045013 A1 Mar. 2, 2006

(51) Int. Cl.
*H04W 72/00* (2009.01)
*H04B 1/16* (2006.01)
*G08C 17/00* (2006.01)

(52) U.S. Cl. .................. 370/229; 370/311; 370/329; 455/452.2; 455/343.2

(58) Field of Classification Search ......... 370/229–232, 370/310, 329, 341, 431, 438, 439, 443, 462, 370/468, 311; 455/434, 450, 452.1, 452.2, 455/453, 343.1–343.6, 517, 524, 525; 718/104, 718/105
See application file for complete search history.

(56) References Cited

U.S. PATENT DOCUMENTS

| | | | |
|---|---|---|---|
| 6,985,453 B2 * | 1/2006 | Lundby et al. | 370/311 |
| 7,050,759 B2 * | 5/2006 | Gaal et al. | 455/67.13 |
| 2004/0062206 A1 | 4/2004 | Soong et al. | |
| 2004/0162083 A1 | 8/2004 | Chen et al. | |
| 2004/0185868 A1 * | 9/2004 | Jain et al. | 455/453 |
| 2004/0215809 A1 * | 10/2004 | Kim et al. | 709/232 |
| 2005/0025077 A1 * | 2/2005 | Balasubramanian et al. | 370/310 |
| 2005/0026624 A1 * | 2/2005 | Gandhi et al. | 455/453 |
| 2005/0111407 A1 * | 5/2005 | Hosein et al. | 370/329 |
| 2005/0141461 A1 * | 6/2005 | Hosein et al. | 370/335 |
| 2005/0176456 A1 * | 8/2005 | Chen et al. | 455/522 |
| 2006/0040674 A1 * | 2/2006 | Vannithamby et al. | 455/452.2 |

FOREIGN PATENT DOCUMENTS

WO  WO 2004/064426  7/2004

OTHER PUBLICATIONS

Young-Uk, Chung et al., "An efficient Reverse Link Data Rate Control Scheme for 1xEV-DV System," Oct. 7, 2001, pp. 820-823, vol. 1, New York, NY, XP010562543.

* cited by examiner

*Primary Examiner*—Aung S Moe
*Assistant Examiner*—Kerri M Rose
(74) *Attorney, Agent, or Firm*—Coats & Bennett, P.L.L.C.

(57) ABSTRACT

A method of Common Rate Control (CRC) command generation considers status bits returned by mobile stations subject to CRC. The status bits from each mobile station, e.g., the Mobile station Status Indication Bits (MSIBs) defined by Release D of the IS-2000 standards, indicate whether the mobile station is capable of increasing its reverse link data rate, and may additionally indicate whether the mobile station has enough data for transmission to warrant a higher rate. Regardless, the status bits indicate how many in a group of mobile stations are capable of increasing their reverse link rates. Thus, a base station's command generation logic can take advantage of the additional knowledge gained from the status bits when generating CRC commands.

16 Claims, 3 Drawing Sheets

COMMON RATE CONTROL COMMAND GENERATION

BACKGROUND OF THE INVENTION

The present invention generally relates to wireless communication networks, and particularly relates to generating common rate control commands at wireless base stations in such networks.

Developing standards define relatively sophisticated mechanisms for increasing the utilization efficiencies of wireless communication networks. For example, Release D of the IS-2000 standards include several Medium Access Control (MAC) layer rate control mechanisms that enable Radio Base Stations (RBS) to influence the reverse link packet data rates of mobile stations responsive to estimated reverse link loading at the RBSs. This ability allows an RBS to increase or decrease its reverse link load by driving mobile station reverse link data rates up or down as needed.

Indeed, the standards define a number of rate control mechanisms that may be used for different mobile stations, or groups of mobile stations. With such controls, the rates of some mobile stations may be driven upward, while the rates of others are driven downward. For example, Release D of the IS-2000 standards provides both Common Rate Control (CRC) and Dedicated Rate Control (DRC). DRC algorithms generate individualized rate control commands for targeted to individual mobile stations, while CRC algorithms generate group-specific rate control commands targeted to selected groups of mobile stations.

The group of mobile stations, for example, may be all mobile stations operating within a radio sector. However, CRC commands may be generated for each of potentially many different groups of mobile stations within the sector. That is, all of the mobile stations in a given group would receive the same CRC commands, but the CRC commands for each group would be generated separately. Such processing allows relatively convenient differentiation of user classes, for example.

However, even though different CRC commands can be generated for different groups of mobile stations, all CRC command generation typically is based on sector loading. As the reverse link loading increases, CRC command generation can be used to drive the reverse link data rates of one or more mobile station groups downward. Conversely, as the sector's reverse link becomes more lightly loaded, CRC command generation can be used to drive the reverse link rates of one or more mobile station groups upward.

In contrast to CRC commands, DRC commands are mobile-specific. That is, DRC commands are individually generated for specific mobile stations, thereby allowing more direct and individualized rate control for particular ones of the mobile stations operating within the radio sector. DRC commands thus might be generated for a select number of mobile stations whose Quality-of-Service (QoS) requirements might not be met using CRC, and the reverse link rate of a mobile station operating under DRC might be driven upward at the same time CRC commands are being used to drive the reverse link rates of a given mobile station group downward.

DRC command generation for a given mobile station generally relies on some form of status feedback from the mobile station. For example, Release D of the IS-2000 standard defines a reverse link rate control feedback mechanism based on a Mobile station Status Indicator Bit (MSIB). For purposes of DRC, mobile stations may return these status bits at a defined rate on the Reverse Packet Data Control Channel (R-PDCCH). Each MSIB from a given mobile station indicates whether that mobile station has enough transmit power headroom to increase its reverse link data rate, and whether it has enough pending data to go to a higher reverse link data rate—e.g., a "1" indicates that the mobile station's reverse link rate should be increased and a "0" indicates that the mobile station's reverse link rate should not be increased.

SUMMARY OF THE INVENTION

The present invention comprises a method and apparatus wherein a base station uses the additional knowledge gained from status bits sent from mobile stations operating under common rate control to modify its generation of common rate control commands for those mobile stations. Each mobile station's status bits indicate whether the mobile station can support a higher rate, and may further indicate that it will benefit from a higher reverse link data rate. Thus, even though common rate control commands are generated for a group of mobile stations rather than for an individual mobile station, the base station can, for example, generate an "up" command when it otherwise would not, if the status bits indicate that only one or a few of the mobile stations in the group can or will increase their rates responsive to an up command. Recognizing such opportunities enables the base station to more efficiently utilize its reverse link capacity.

In general, the reverse link loading at the base station may be used as a basis for generating common rate control commands, e.g., generating up, down, or hold commands as a function of how heavily the reverse link is loaded. However, common rate control command generation may be modified under certain circumstances, such as where the reverse link is heavily loaded and/or there are a relatively small number of mobile stations subject to common rate control. In such circumstances the base station can more intelligently determine what command value(s) to generate by identifying from the status bits how many mobile stations in a given group can increase their data rates. For example, if only one or a limited few of the mobile stations can increase their rates, then an up command can be sent even under high loading conditions because only one or a few of the mobile stations will go up.

Thus, in an exemplary embodiment, the present invention comprises a method of reverse link rate control at a base station comprising receiving status bits from mobile stations in a group of mobile stations subject to common rate control, said status bits from each mobile station indicating whether the mobile station can increase its reverse link data rate, and selectively generating common rate control commands for the group of mobile stations based on evaluating the status bits. Such evaluation may comprise generating the common rate control commands based on the status bits if a reverse link loading at the base station is high or if the number of mobile stations in the group is small, and otherwise generating the common rate control commands based on the reverse link loading irrespective of the status bits. A defined count value stored at the base station may be used to define what constitutes a "small" number.

The present invention is not limited to a particular method of generating common rate control commands based on the status bits. For example, whether an up, down, hold, or other particular command value is generated during a given command interval may be made to depend on identifying from the status bits how many of the mobile stations can increase their reverse link data rates.

Alternatively, the value of the status bits may be used to adjust the probability of generating a particular command value. Thus, a probability function used to generate up commands may be adjusted so that the probability of generating an up command depends on the status bits received from the mobile stations in one or more common rate control groups.

As a further alternative, command generation may be based on the status bits by making one or more of the defined load thresholds used for evaluating the reverse link loading at the base station dependent on the status bits received from the mobile stations in one or more common rate control groups. For example, in such embodiments, the load threshold used to identify a high loading condition at the base station may be adjusted upward if only one or a small number of the mobile stations subject to common rate control indicate that they can increase their reverse link rates. Such logic makes sense because the increased loading that might result from sending an up command is minimal if only one or a few mobile stations are in a position to respond to such a command.

With the above in mind, then, an exemplary base station comprises one or more rate control processors configured to process status bits from mobile stations in a group of mobile stations subject to common rate control, the status bits from each mobile station indicating whether the mobile station can increase its reverse link data rate, and to selectively generate common rate control commands for the group of mobile stations based on evaluating the status bits.

As detailed above, processing by the one or more rate control processors may be configured to use the status bits in generating the common rate control commands. Such processing may be based on identifying from the bits how many mobile stations can increase their reverse link rates, by using them to adjust one or more loading threshold used in evaluating reverse link loading for purposes of common rate control command generation, by using them to change command generation probabilities, or any combination thereof. In any case, the base station may be configured as a base station system comprising a radio base station and an associated base station controller. Preferably, the one or more rate control processors are at least partly implemented in the radio base station.

Of course, the present invention is not limited to the above features and advantages. Indeed, those skilled in the art will recognize additional features and advantages of the present invention upon reading the following description, and upon viewing the accompanying drawings.

DETAILED DESCRIPTION OF THE INVENTION

Figure 2:
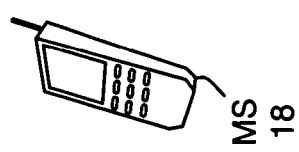
FIG. 2 is a diagram of an exemplary mobile station, which may be rate controlled on a reverse link by the base station of FIG. 1, and which may be configured to send reverse link status bits to the base station.
Figure 1:
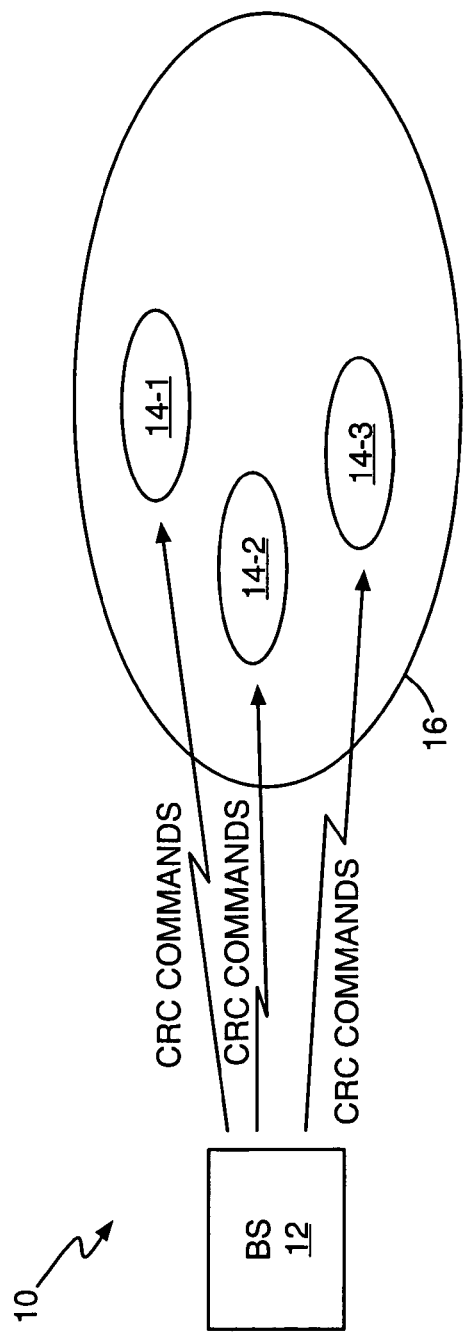
FIG. 1 is a diagram of an exemplary wireless communication network according to the present invention.

FIG. 1 partially illustrates a wireless communication network 10 that includes a base station (BS) 12 configured to generate common rate control (CRC) commands for one or more mobile station groups 14 operating within a radio cell/sector of BS 12—groups 14-1, 14-2, and 14-3 are illustrated, but any number of groups 14 may be defined within the cell/sector 16. In this context, FIG. 2 illustrates an exemplary mobile station 18, and it should be understood that each group 14 comprises one or more such mobile stations 18.

As used herein, the term "mobile station" should be given broad construction, and it is meant to denote essentially any type of wireless communication device. Thus, mobile station 18 may comprise but is not limited to a cellular radiotelephone, a Portable Digital Assistant (PDA), a palmtop/laptop computer, a wireless pager or other two-way communicator. In at least one embodiment, network 10 comprises a cdma2000 wireless communication network and the groups 14 comprise mobile stations 18 configured as cdma2000 cellular telephones.

Figure 3:
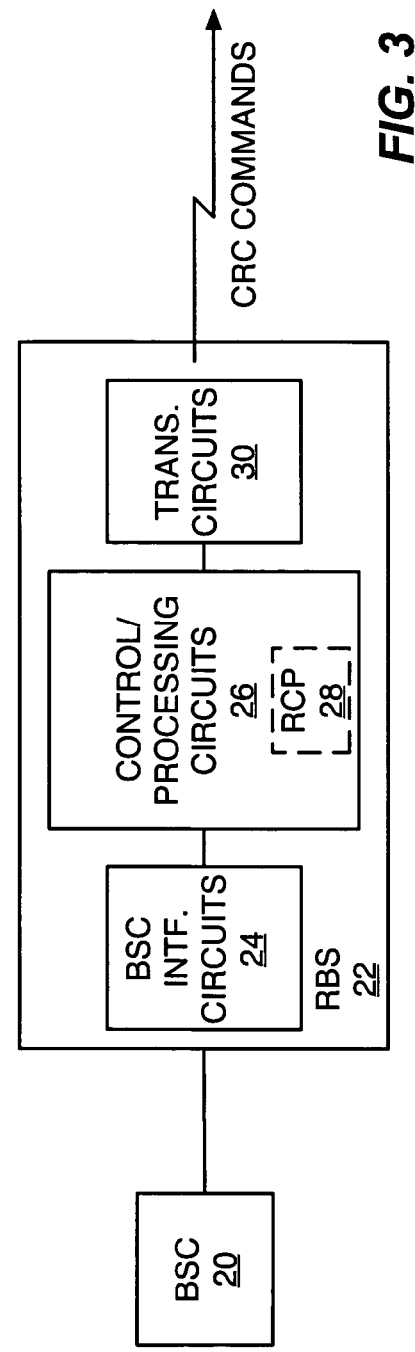
FIG. 3 is a diagram of an exemplary embodiment of the base station of FIG. 1.

Regardless, FIG. 3 illustrates that BS 12 may be implemented as a Base Station System (BSS) comprising a Base Station Controller 20 and a Radio Base Station (RBS) 22. An exemplary RBS 22 comprises interface circuits 24, control/processing circuits 26, including one or more rate control processors 28, and transceiver circuits 30. In an exemplary embodiment, the one or more rate control processors 28 are configured to generate CRC commands for any number of mobile station groups 14 subject to CRC by BS 12. Such commands are transmitted to the mobile stations 18 via transceiver circuits 30. For an exemplary discussion of transmitting CRCs over one or more Forward Rate Control Channels (F-RCCHs), one may refer to U.S. application Ser. No. 10/755,104, which was filed on 9 Jan. 2004, and which is incorporated herein by reference.

Performing CRC command generation at the RBS-level eliminates or reduces the RBS-to-BSC signaling needed to support CRC command generation for reverse link rate control. However, it should be understood that the present invention contemplates embodiments wherein rate control processing is partly or wholly implemented at the BSC 20. Further, it should be understood that the rate control processor(s) 28 may comprise hardware, software, or any combination thereof. As such, the rate control processor(s) 28 may comprise one or more appropriately configured microprocessors, Digital Signal Processors (DSPs), Field Programmable Gate Arrays (FPGAs), Application Specific Integrated Circuits (ASICs), etc.

Figure 4:
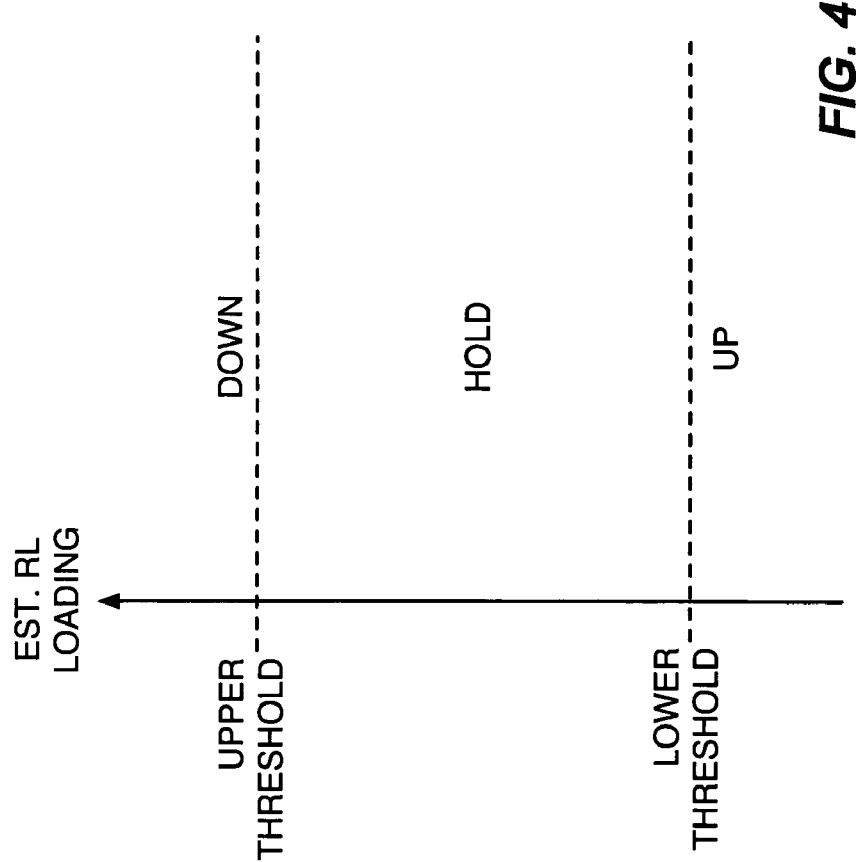
FIG. 4 is a diagram of exemplary defined loading thresholds for use in generating common rate control commands for controlling the reverse link rates of one or more groups of mobile stations.

With the above in mind, then, FIG. 4 illustrates an exemplary, general basis for generating CRC commands for a given group 14 of mobile stations 18. In the illustration, CRC commands can take on one of three particular values (UP, DOWN, and HOLD), depending on where a current estimate of reverse link loading at the base station is in comparison to one or more defined loading thresholds. More particularly, the illustrated upper and lower thresholds define three regions: a high load region above the upper threshold, a low load region below the lower threshold, and an intermediate load region between the two thresholds.

CRC command generation for a given group 14 can be configured to generate down commands if the current estimate of reverse link loading falls in the high load region, generate up commands if the current estimate of reverse link loading falls in the low load region, and generate hold commands if the current estimate of reverse link loading falls in the intermediate load region. As noted, the same CRC commands can be used for more than one group 14, or different CRC commands can be generated for different groups 14. Different CRC commands can be generated for different groups 14 by using different loading thresholds, or by modifying the command generation logic used for different groups.

However, generating CRC commands based on reverse link loading can lead to inefficiencies in reverse link utilization. The present invention addresses this and other issues by providing a method and apparatus for basing CRC command generation on status bits transmitted by the mobile stations 18 that are subject to CRC. As explained earlier herein, Release D of the IS-2000 standards provides for the transmission of status bits from mobile stations in the form of MSIBs for use in DRC command generation.

In the context of DRC command generation, the use of such status bits is logical because DRC commands are generated on a mobile-specific basis. Therefore, determining whether to generate an up, down, or hold command for a particular mobile station 18 can be directly based on whether the status bits from that particular mobile station 18 indicate whether it can support a higher reverse link data rate. DRC command generation would not send an up command to a mobile station 18 whose status bits indicate that it cannot or should not increase its reverse link data rate.

However, conventional approaches to CRC command generation do not use the mobile-specific status bits to generate CRC commands, since such commands are by definition intended for a group of mobile stations rather than for an individual mobile station. For example, if the currently estimated reverse link loading is above the upper loading threshold as defined for a given group 14, conventional CRC command generation would simply generate down commands for the duration that the threshold was exceeded. At least one embodiment of the present invention changes that command generation logic by considering the status bits returned from the mobile stations 18 comprising that group 14.

For example, by evaluating the status bits returned from each mobile station 18 in the group 14, BS 12 may determine that only a small number (e.g., one, two, or three) of the mobile stations 18 in the group can (or want to) increase their reverse link data rates. That additional knowledge gives BS 12 the ability to recognize that the increase in reverse link loading arising from the issuance of an up command to the group 14 will be minimal, or certainly much less than would be expected from the worst-case assumption that all mobile stations 18 in the group 14 would increase their reverse link rates if BS 12 sends an up command to the group 14. BS 12 can therefore send an up command when it otherwise would have sent a down or hold command, and those few mobile stations 18 in group 14 that desire a rate increase are thus allowed to increase their reverse link data rates. By letting those few mobile stations 18 go up in rate, BS 12 makes more efficient use of its reverse link capacity.

Figure 5:
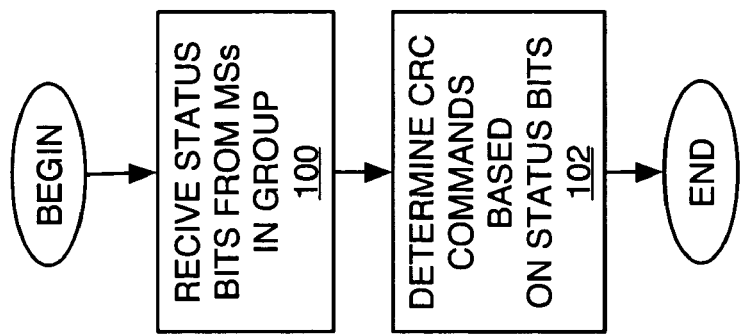
FIG. 5 is a diagram of exemplary processing logic for generating common rate control commands in accordance with the present invention.
Figure 6:
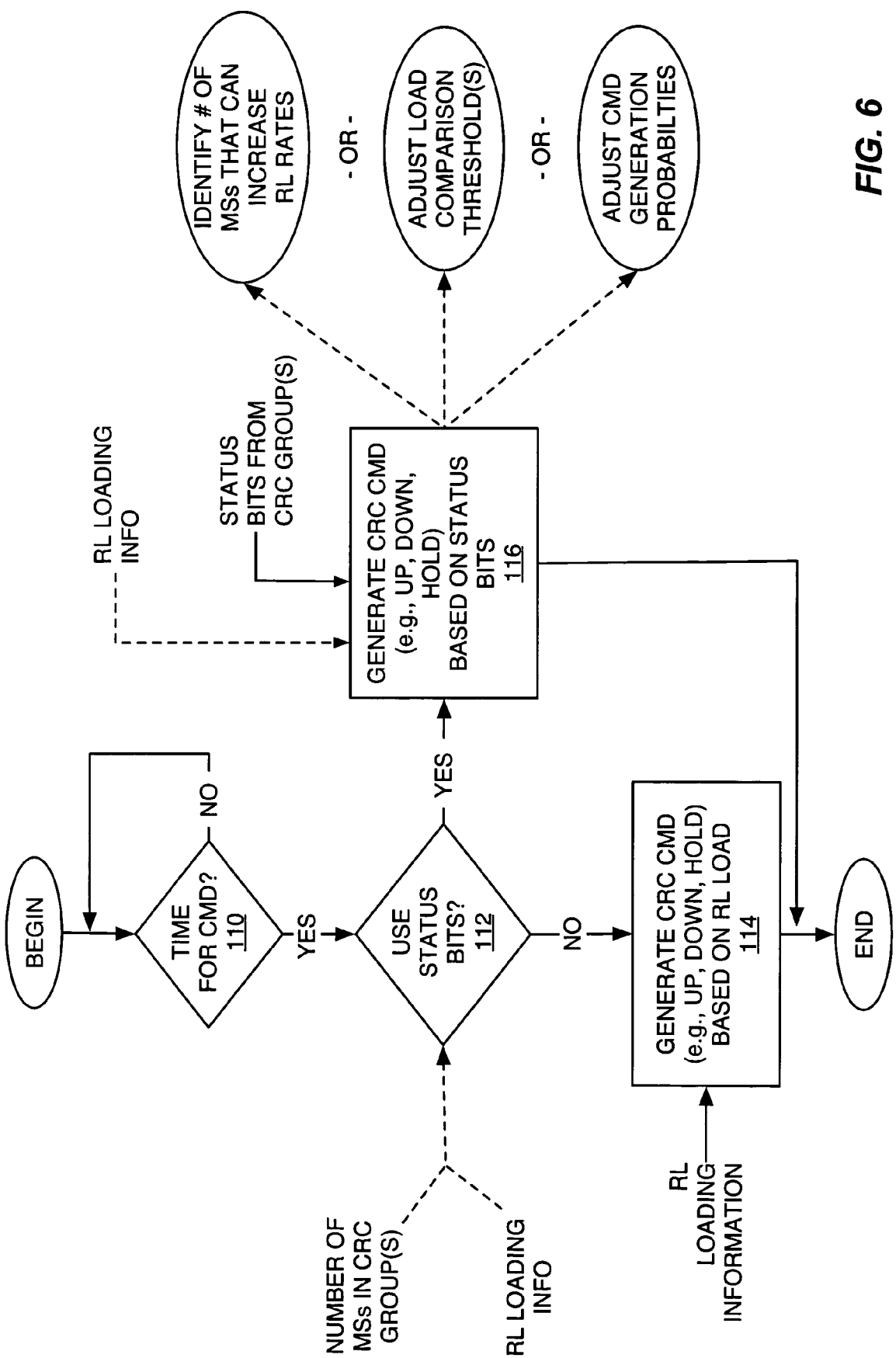
FIG. 6 is a diagram of exemplary processing logic details for the diagram of FIG. 5.

With that specific example in mind, FIG. 5 broadly illustrates exemplary processing logic that can be implemented in BS 12 as hardware, software, or some mix thereof, by the one or more rate control processors 28 at RBS 22 and/or BSC 20. Exemplary CRC command generation is based on receiving status bits from mobile stations 18 in one or more groups 14 that are subject to CRC (Step 100). BS 12 then generates the CRC commands based on those status bits (Step 102). FIG. 6 provides exemplary processing details for these broad method steps.

In particular, FIG. 6 illustrates exemplary processing for generating CRC commands according to a timed generation schedule. For example, BS 12 can be configured to send CRC commands to a given group 14 at the reverse link frame rate, so that the mobile stations 18 in that group 14 receive in frame n the command value to use in determining whether to adjust their reverse link rates for frame n+1. Of course, other command timing methods may be employed as needed or desired.

Exemplary CRC command generation processing begins with an evaluation of whether it is time to generate the next CRC command for a group 14 (Step 110). If different CRC commands were being generated for different groups 14, then the same generation logic could be carried out concurrently for each such group.

Assuming that it is time to generate the next CRC command, processing continues with a determination of whether to use the status bits received from the individual mobile stations 18 in the group 14 in CRC command generation (Step 112). As noted earlier herein, CRC commands may be generated based on the status bits if the number of mobile stations 18 in the group 14 is small and/or if the reverse link (RL) loading is high. Otherwise, the CRC commands may be generated, for example, based on the RL loading irrespective of the status bits.

Thus, if there are too many mobile stations 18 in the group 14 and/or if the current RL loading at BS 12 is not at or above the high loading threshold, exemplary CRC command is based on the current RL loading (Step 114). Conversely, if the RL loading is high and/or if the number of mobile stations 18 in the group 14 is small, then CRC command generation is based on the status bits returned from individual ones of the mobile stations 18 in the group 14 (Step 116). Such generation also may consider RL loading and other factors as well, but in an exemplary embodiment, the generation of a particular value of CRC command (e.g., up, down, hold) is based on identifying from the received status bits how many mobile stations 18 in the group 14 can (or want to) increase their reverse link data rates.

That information provides BS 12 with a better understanding of the impact on RL loading that would result from it issuing a particular value of CRC command to the group 14. For example, RL loading may be such that rate increases by two or fewer mobile stations 18 in a group 14 can be tolerated. If the status bits indicate that more than that number of mobile stations 18 can increase their reverse link rates, then BS 12 would issue a hold or down command for the next interval. However, if the status bits indicate that less than three mobile stations 18 in the group 14 can increase their rates, then BS 12 would issue an up command, confident that no more than two mobile stations 18 in the group 14 can respond to that command.

Thus, CRC command generation can be based on the status bits by directly using the status bits to determine the command to be issued. However, the present invention contemplates other methods for evaluating the status bits in the context of CRC generation. For example, in another exemplary embodiment, the status bits received by BS 12 for the mobile stations 18 in a given group 14 are used to adjust the RL loading thresholds upon which CRC command generation for that group is based.

To better understand this method, one may refer to FIG. 4, wherein three regions were defined by upper and lower RL loading thresholds. At each command interval, the current estimate of RL loading at BS 12 is compared to the thresholds to determine in which region the loading estimate lies. If the estimate lies in the upper region, a down command is generated, if the estimate lies in the middle region, a hold command is generated, and if the estimate lies in the lower region, an up command is generated.

The particular command values generated for various RL loading conditions thus depend on where the thresholds are set. Therefore, for a given group 14, BS 12 may be configured to use knowledge gained from its evaluation of the corresponding status bits to adjust the thresholds used for that group 14. For example, if the received status bits indicate that none or a small number of mobile stations 18 in the group 14 can increase their rates, BS 12 might move the upper threshold upward by a desired amount before carrying out the RL loading comparison. The act of shifting the upper threshold higher might thus result in the generation of a hold command rather than a down command.

In particular, the upper threshold can be adjusted as a function of filtered status bits. That is, the relevant status bits can be aggregated or otherwise filtered to obtain a filtered status bit value. If that value is close to 1, meaning that most of the individual status bits being considered for a given group 14 were 1, then the upper threshold can be raised, which increases the likelihood of generating a hold command rather than a down command. Conversely, if the filtered status bit value is close to 0, meaning that most of the individual status bits were 0, then the upper threshold can be decreased.

Similarly, the lower threshold can be shifted responsive to the status bits. For example, if the status bits indicate that all of the mobile stations 18 in the group 14 can increase their rates, BS 12 might lower the lower threshold, which may result in a hold command rather than an up command being generated. Of course, those skilled in the art will recognize that any number of variations with respect to threshold shifting may be practiced as needed or desired. Further, it should be recognized that BS 12 can be configured to maintain and adjust a set of thresholds for each of a plurality of groups 14 subject to CRC. By giving each group 14 its own set of thresholds, BS 12 can adjust each group's thresholds based on the status bits returned by that group 14.

In another exemplary embodiment, CRC command generation is based on the status bits according to a method wherein the probability of generating a particular command value for a given group 14 is adjusted as a function of the status bits returned for that group 14. Of course, this method can be used for generating CRC commands for multiple groups 14 and, again, BS 12 may or may not use group preferences to implement preferential service to one or more groups 14.

In looking at a per-sector CRC command generation example, assume that all received status bits from mobile stations 18 in a given sector of BS 12 are "1," where a "1" indicates the capability to increase rate. Then, even if the current RL loading estimate falls into the hold region, BS 12 still may send up commands for that sector with an adjustable probability between 0 and 1. An exemplary implementation for this method of CRC command generation is:

filter the status bit information on a per-sector basis for BS 12, e.g., $$MSIB_{Filter}(n) = a \cdot MSIB_{Filter}(n-1) + (1-a) \cdot \sum_{k=1}^{M} MSIB_k(n),$$

where MSIBFilter(n)=the filtered value of status bits for the sector for frame index n, a=the filter constant, k=the mobile station index, which runs from 1 to the total number of mobile stations M in the sector that are subject to CRC;

if the currently estimated RL loading for the sector falls into the hold region, then generate up commands with the following probability:

p·MSIB$_{Filter}$ (n), where p is a non-negative value between 0 and 1.

Note that where p=0, the probabilistic generation is effectively disabled.

Thus, if CRC command generation is to be based on the status bits, then the value of p can be adjusted up or down based on the mix of status bit values received.

The command generation logic described above can be adapted for other loading regions, such as for sending down commands with an adjustable probability. Note, too, that probabilistic command generation can be used on a per-group basis in addition, or as an alternative, to the per-sector processing outlined above. Thus, BS 12 may evaluate the mix of status bit values returned from a given group 14 of mobile stations 18 to set the probabilities for CRC command generation for that group.

As an additional point regarding the probabilistic generation of CRC commands, it may be noted that the probabilistic generation of up commands during conditions where the RL loading lies in the hold region can be improved by considering the currently estimated RL load versus the upper load threshold. In general, the closer the loading estimate lies to the upper threshold, the lower the probability of sending an up command should be. Thus, the value of p as used in up command generation can be made a function of both status bits and the proximity of the estimated RL loading to the upper threshold.

Probabilistic generation thus represents one of several methods on which CRC command generation can be made to depend on the status bits returned from individual mobile stations 18 subject to CRC by BS 12. However, as noted, other methods are contemplated herein, with direct command generation being one example, and dynamic threshold adjustment being another example.

Regardless of the particular command generation method adopted, BS 12 can be configured according to the present invention to generate common rate control commands for the one or more groups of mobile stations based at least in part on status bits received from each mobile station that indicate whether the reverse link rate of the mobile station can be increased. Such operation may be made modal, such that status bit based CRC command generation is carried out in a first mode.

An exemplary basis for operating in the first mode is determining that the number of mobile stations 18 subject to CRC is small and/or recognizing that the current RL loading is high. BS 12 also may be configured to operate in a second mode if those conditions are not satisfied, wherein in the second mode of operation, generating common rate control commands for the one or more groups is not based on the status bits.

With the above features, advantages, and variations in mind, then, those skilled in the art should recognize that the present invention is not limited to any particular exemplary embodiment described herein. Indeed, the present invention broadly comprises a method and apparatus for generating CRC commands at a base station in at least some modes of operation, for at least some of the mobile stations subject to CRC by that base station. As such, the present invention is not limited by the foregoing discussion, but rather is limited only by the following claims and their reasonable legal equivalents.

What is claimed is:

1. A method of reverse link rate control at a base station comprising:

receiving status bits from mobile stations in a group of mobile stations subject to common rate control, said status bits from each mobile station indicating whether the mobile station can increase its reverse link data rate; and selectively generating common rate control commands for the group of mobile stations based on evaluating the status bit, wherein selectively generating common rate control commands for the group of mobile stations based on evaluating the status bits comprises:

(i) generating the common rate control commands based on the status bits if a reverse link loading at the base station is high, and otherwise generating the common rate control commands based on the reverse link loading irrespective of the status bits; or (ii) generating the common rate control commands based on the status bits if the number of mobile stations in the group is below a defined count, and otherwise generating the common rate control commands based on a reverse link loading at the base station irrespective of the status bits; or (iii) generating the common rate control commands based on the status bits if a reverse link loading at the base station is high and if the number of mobile stations in the group is below a defined count, and otherwise generating the common rate control commands based on the reverse link loading irrespective of the status bits.

2. The method of claim 1, wherein selectively generating common rate control commands for the group of mobile stations based on evaluating the status bits comprises, during conditions wherein a reverse link loading at the base station would otherwise prevent the generation of up commands, generating one or more up commands for the group if the status bits indicate that only one or a few of the mobile stations in the group can increase their reverse link data rates.

3. The method of claim 1, wherein selectively generating common rate control commands for the group of mobile stations based on evaluating the status bits comprises determining the particular common rate control commands to be sent to the group based on identifying from the status bits how many mobile stations in the group can increase their reverse link data rates.

4. The method of claim 1, wherein selectively generating common rate control commands for the group of mobile stations based on evaluating the status bits comprises generating the common rate control commands based on one or more probability functions, and adjusting one or more of the one or more probability functions based on the status bits.

5. The method of claim 4, wherein adjusting one or more of the one or more probability functions based on the status bits comprises setting one or more probabilities for generating a particular value of the common rate control commands based on identifying from the status bits how many mobile stations in the group can increase their reverse link data rates.

6. The method of claim 1, wherein selectively generating common rate control commands for the group of mobile stations based on evaluating the status bits comprises generating particular values of the common rate control commands based on comparing a reverse link loading at the base station to one or more defined loading thresholds, and adjusting one or more of the defined loading thresholds based on the status bits.

7. The method of claim 6, wherein adjusting one or more of the defined loading thresholds based on the status bits comprises changing the value of one or more of the defined loading thresholds based on identifying from the status bits how many of the mobile stations in the group can increase their reverse link data rates.

8. A base station system comprising one or more rate control processors configured to generate common rate control commands for a group of mobile stations:

process status bits from mobile stations in a group of mobile stations subject to common rate control, said status bits from each mobile station indicating whether the mobile station can increase its reverse link data rate; and selectively generate common rate control commands for the group of mobile stations based on evaluating the status bits, wherein the or more rate control processors are configured to:

(i) generate the common rate control commands based on the status bits if a reverse link loading at the base station is high, and otherwise generate the common rate control commands based on the reverse link loading irrespective of the status bits; or (ii) generate the common rate control commands based on the status bits if the number of mobile stations in the group is below a defined count, and otherwise generate the common rate control commands based on a reverse link loading at the base station irrespective of the status bits; or (iii) generate the common rate control commands based on the status bits if a reverse link loading at the base station is high and if the number of mobile stations in the group is below a defined count, and otherwise generate the common rate control commands based on the reverse link loading irrespective of the status bits.

9. The base station system of claim 8, wherein the one or more rate control processors are configured, during conditions wherein a reverse link loading at the base station would otherwise prevent the generation of up commands, to generate one or more up commands for the group if the status bits indicate that only one or a few of the mobile stations in the group can increase their reverse link data rates.

10. The base station system of claim 8, wherein the one or more rate control processors are configured to determine the particular common rate control commands to be sent to the group based on identifying from the status bits how many mobile stations in the group can increase their reverse link data rates.

11. The base station system of claim 8, wherein the one or more rate control processors are configured to generate the common rate control commands based on one or more probability functions, and to adjust one or more of the one or more probability functions based on the status bits.

12. The base station system of claim 11, wherein the one or more rate control processors are configured to set one or more probabilities for generating a particular value of the common rate control commands based on identifying from the status bits how many mobile stations in the group can increase their reverse link data rates.

13. The base station system of claim 8, wherein the one or more rate control processors are configured to generate particular values of the common rate control commands based on comparing a reverse link loading at the base station to one or more defined loading thresholds, and to adjust one or more of the defined loading thresholds based on the status bits.

14. The base station system of claim 13, wherein the one or more rate control processors are configured to change the value of one or more of the defined loading thresholds based on identifying from the status bits how many of the mobile stations in the group can increase their reverse link data rates.

15. A method of generating common rate control commands at a base station for one or more groups of mobile stations comprising selectively operating in first and second modes, wherein:
- in the first mode of operation, generating common rate control commands for the one or more groups of mobile stations is based at least in part on status bits received from each mobile station that indicate whether the reverse link rate of the mobile station can be increased;
- in the second mode of operation, generating common rate control commands for the one or more groups is not based on the status bits; and
- determining whether to operate in the first mode or in the second mode based on evaluating a reverse link loading condition at the base station and further based on determining how many mobile stations are in one or more of the one or more groups, such that selective operation in the first and second modes depends on reverse link loading and the number of mobile stations subject to common rate control.

16. The method of 15, wherein determining whether to operate in the first mode or in the second mode based on evaluating a reverse link loading condition at the base station comprises choosing the first mode if the reverse link loading is above a defined high loading threshold.

* * * * *